June 3, 1930.  J. GUTH  1,761,262
TRACTION WHEEL CLEANING DEVICE
Filed May 13, 1927
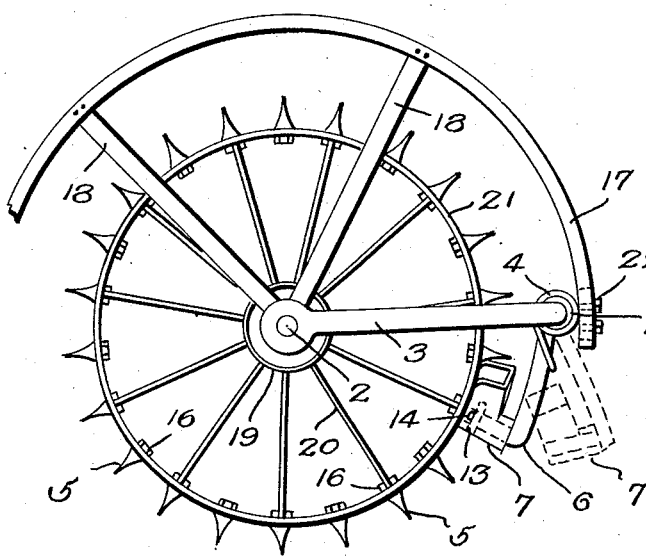
Fig. 1.
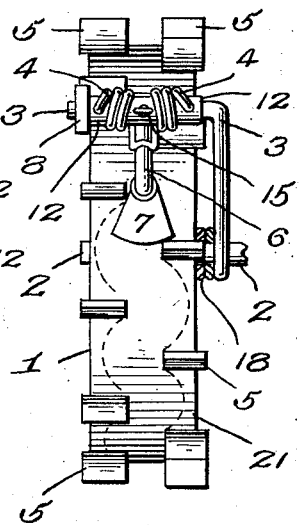
Fig. 5.
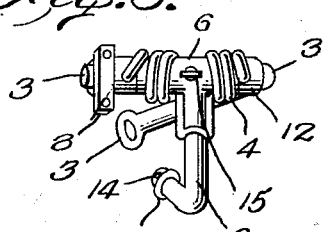
Fig. 3.
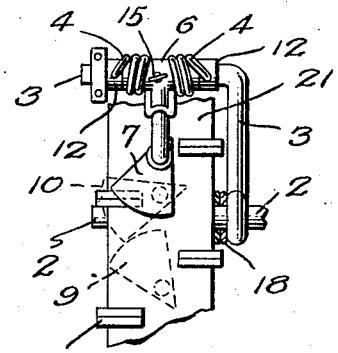
Fig. 6.
Fig. 4.
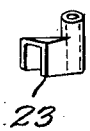
Fig. 2.
Inventor
Jacob Guth Patented June 3, 1930

1,761,262

UNITED STATES PATENT OFFICE

JACOB GUTH, OF ST. LOUIS, MISSOURI

TRACTION-WHEEL-CLEANING DEVICE

Application filed May 13, 1927. Serial No. 191,215.

This invention has reference to master or driving wheels for traction machinery, or where engagement of the wheel with the ground is relied upon for the driving of moving parts by the progressive travel of the wheel.

It is customary to provide tractors or traction engines with driving wheels having peripheral lugs designed to engage the ground to thus increase the tractive effect, and it is likewise customary to mount wheels with peripheral lugs on machines which may be propelled over the ground by other means, and power may be taken from such wheels, then termed master wheels. For various purposes, it is found in practice that a traction wheel provided with a ribbed periphery is liable to take up the soil, which, under some conditions, clings tenaciously to the wheel.

The present invention is designed to provide a master or traction wheel which will have full tractive engagement with the ground over which it passes, and which to a large extent is self-cleaning, and is kept particularly clean by the employment of my new scraper, which in conjunction with the particular construction of the lugs employed on the active face of the wheel, most effectively frees the wheel from clinging soil which becomes particularly troublesome in master wheels as ordinarily constructed.

In order to accomplish those results, the traction lugs of the master wheel are arranged in two annular series staggeredly bolted to the rim from the inner side of the wheel, and a V-shaped scraping device arranged to have rotative movement near its forward end, and its rear gradually widening, which effectively cleans the wheel between the two series of lugs, and between each lug, which is accomplished only by having the lugs staggeredly spaced.

This invention does not only provide a master or a traction wheel which will have full tractive engagement with the ground and a scraping device to be used at the will of the operator, but also permits reversal of the tractor without disengaging the scraping device. The novel construction of the scraper blade which is a V-shape like, open at the rear and bottom, permits the reception of a traction lug when the wheel is reversed and thereby facilitates a reversal of the blade.

This invention will be best understood from a consideration of the following detailed description, taken in connection with the accompanying drawings forming a part of this specification; with the further understanding that while the drawings show a practical embodiment of the invention, the latter is not limited to my strict conformity with the showing of the drawings, but may be changed and modified so long as such changes and modifications mark no material departure from the salient features of the invention.

In the drawings, Fig. 1 is an elevation of a master wheel equipped with the present invention. Fig. 2 is a perspective view of the scraper blade employed in the device of Fig. 1. Fig. 3 is a perspective view of the scraper frame. Fig. 4 is a bottom plan view of the scraper blade. Fig. 5 is a rear view of the complete assembly shown in Fig. 1. Fig. 6 is a view similar to Fig. 5 and showing the several positions assumed by the scraper blade during reversal.

Referring to the drawings, there is shown a wheel 1, provided with axle 2. The frame 3 for scraping device which is to be mounted on the axle and extends to the outer part of the wheel and then horizontally to a support 8 on the fender 17. The frame or supporting member 3 is bent at a right angle to form a journal, parallel to the surface 21 of the wheel, on which a T-shaped frame 6 is mounted. The cross portion of the T-shaped frame 6 is provided with a bearing into which the journal of the member 3 is fitted, thereby providing a pivotal connection between these members. A pair of collars 12 are provided on the journal for retaining the T-shaped member 6 in the desired position thereon, which in this embodiment of my invention is the position in which the depending leg of the T-shaped frame 6 lies in the medial plane of the wheel. A coil spring 4 is provided on the frame 3 for biasing the depending leg of the T-shaped frame 6 toward the tractor wheel and is retained in position by the collars 12.

The lower end to the depending leg of the T-shaped frame 6 is bent to provide a pivotal mounting for a scraper blade 7, whereby the blade 7 is free to oscillate in a plane tangent to the surface of the wheel 1. The wheel 1 is provided in the conventional manner, with a plurality of traction elements or lugs 5, which are in staggered relation about the periphery of the wheel.

The V-shaped blade 7, whose vertex is always the leading edge of the blade, and is to follow the medial plane of the wheel 1, in the path between the alternate traction lugs 5, and the rear or wide portion of the blade 7, oscillates in a sinuous path between the two series of staggered lugs. In operation the soil is parted in the medial of the wheel by the scraper 7, and on account of the tapered lugs, it raises the soil above the lugs, and falls to each side of the wheel, as shown by the dotted lines in Fig. 5, whereby any accumulation of matter is readily removed therefrom, as the wheel rotates.

It often becomes necessary to reverse the direction of the tractor's travel, and this may be accomplished with my scraper without necessitating the disengagement of the blade from the wheel. The novel structure of the blade 7 renders this possible. The blade 7 is V shaped, and in operation the vertex of the V is always the leading edge of the blade, and it will be observed from Fig. 6 that when the direction of the wheel is reversed, one of the traction lugs 5 engages within one wall of the V, and turns it as indicated at 10, the lug entering between the walls of the V. When the vertex of the blade 7 has passed the lug 5, the blade is gradually removed from the lug 5 and further movement brings it into the position indicated at 9, whereupon the vertex of the blade is the leading edge for this direction of travel.

What I claim is:—

1. In a tractor, the combination with a wheel having traction elements disposed in staggered relation about the periphery thereof, of a scraper, comprising a supporting member and having a leg swingable in the medial plane of said wheel, a spring biasing the leg toward the wheel, and a scraper blade pivoted to said leg for oscillation in a plane tangent to the wheel, whereby the trailing edges of the blade may follow a sinuous path between alternate traction elements as the tractor progresses.

2. The combination with a tractor wheel having a plurality of spaced annular series of traction elements, said traction elements of one series being staggered relative to the traction elements of another series, a scraper blade having its leading edge narrower than the space between the series of traction elements, and its trailing edges wider than said space, and single pivotal means which is always the leading edge whereby the trailing edges of the blade oscillates in a sinuous path between alternate traction elements and inverts upon reversal of the wheel.

In testimony whereof, I affix my signature.

JACOB GUTH.